Oct. 4, 1932.  C. H. DAVIS, JR  1,880,375
CLAMPING DEVICE
Filed March 14, 1931

Inventor
Charles Hall Davis, Jr.
By
Spencer Hardman & Fehr
His Attorneys

Patented Oct. 4, 1932

1,880,375

UNITED STATES PATENT OFFICE

CHARLES HALL DAVIS, JR., OF ANDERSON, INDIANA, ASSIGNOR TO DELCO-REMY CORPORATION, OF ANDERSON, INDIANA, A CORPORATION OF DELAWARE

CLAMPING DEVICE

Application filed March 14, 1931. Serial No. 522,562.

This invention relates to improvements in clamping devices, and more particularly to a clamping device that is used to adjust the timing of a distributor for an internal combustion engine.

One object of the present invention is to provide a simple and efficient means for the adjustment with precision of various parts of a mechanism. This is accomplished by providing a bolt having a groove between its ends, a sleeve mounted on said bolt, and the sleeve having an end extending into the groove of the bolt to prevent removal thereof. The bolt is used to accurately regulate parts without any danger of throwing the parts out of proper adjusted position during the clamping process.

It has been the custom in prior art devices to secure the sleeve upon the bolt by a spring seated in the groove holding the sleeve loosely on the bolt. But it often happens that when the clamping devices of that type is removed to make adjustments, that the ring would shear off, jam or break down. In removing the bolt, the threads were therefore damaged to such an extent, that the bolt had to be rethreaded or replaced. In many instances, after the bolt had been removed, the sleeve would remain in a locking position; so that it was removed with difficulty, and special tools had to be used to remove the sleeve, resulting in further damaging of parts which had to be replaced. Thus the withdrawal of that type of clamping device resulted in much difficulty in repair and removal of damaged parts.

Further objects and advantages of the present invention will be apparent from the following description, reference being had to the accompanying drawing wherein a preferred embodiment of one form of the present invention is clearly shown.

Figure 1:
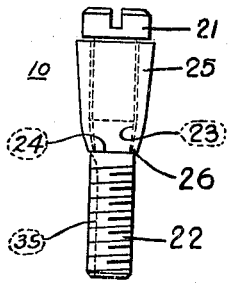
Fig. 1 is a side view of the device.
Figure 2:
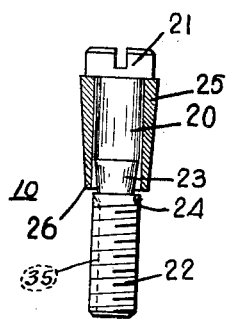
Fig. 2 is a view illustrating the association of parts of the clamping device prior to permanent assembly.

Referring to the drawing, a clamping device 10 comprises a bolt 20 that is provided with a head 21 and a threaded portion 22. The bolt 20 is provided with a tapered groove 23 disposed at a distance from the head 21 forming a shoulder 24. Between the head 21 and the shoulder 24, a sleeve 25 is positioned, which is preferably provided with an externally conical surface. The distance between the shoulder 24 and the head 21 is greater than the length of the sleeve 25. An end 26 of the sleeve 25 is compressed so that it will extend in the groove 23 to prevent removal of the sleeve 25 from the bolt 20.

Figure 3:
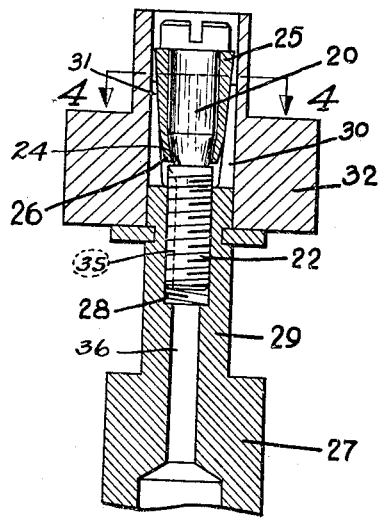
Fig. 3 is a detail fragmentary view showing the clamping device embodying the invention applied to a mechanism.
Figure 4:
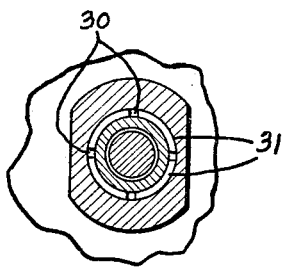
Fig. 4 is a sectional view on the line 4—4 of Fig. 3.

One adaptation is illustrated in Fig. 3 where a cam carrying element 27 fits over a shaft (not shown). The element 27 is provided with a threaded portion 28 to receive the threaded end 22 of the bolt 20. The element 27 has a reduced head portion 29 provided with a recess with a conical wall which conforms to the conical surface of the sleeve 26, and is suitably slotted as at 30, providing quadrants or fingers 31 that are expansible and resilient. The threaded portion 22 of the bolt 20 is provided with a longitudinal groove 35 that affords communication between the slots 30 of the fingers 31 allowing a lubricant to seep down to an axial passage 36 in the element 27 to lubricate parts of mechanism (not shown).

Referring again to Fig. 3, a cam 32 is placed upon the expansible quadrants of the cam carrying element 27, and adjusted to its proper angular position where it is held or secured by the clamping device 10. The clamping device carrying the conical sleeve 25 is forced downwardly within the quadrants of the cam carrying element 27 spreading the quadrants 31 clamping the cam 32 in place as the threaded end of the bolt 20 engages the threaded portion 28 formed in the cam carrying element 27, as illustrated in Fig. 3.

When the clamping device is threaded into the cam carrying element, the tapered sleeve 25 engages the expansible quadrants 31, and forces the same outwardly into frictional engagement with the cam 32. Inasmuch as the bolt 20 turns relative to the sleeve 25 there is no tendency for an imperfect contact between the quadrants and the sleeve, thus an even distribution of pressure is exerted against each of the quadrants or fingers 31 and the cam 32 is prevented from rotating about the portion 29.

It is well understood to those skilled in the art, that the adjustment of the timer cam must be made with precision, and that it becomes necessary to change the adjustment from time to time, to compensate for wear of parts.

It will be seen by referring to Fig. 3 that the sole movement of the sleeve 25 is directed along the axis of the bolt 20, that is, the sleeve has substantially no turning effect when it engages the fingers 31, and therefore efficient expansion of the fingers is effected by the forcing of the sleeve between the fingers.

When it is desired to release the cam for the purpose of readjustment, or for complete removal, the bolt 20 is unscrewed and when the bolt 20 works upwardly as shown in Fig. 3, the lower end of the tapered sleeve 25 engages the shoulder 24, and the sleeve will be forced out of its locking position, so as to permit the readjustment of the cam, or complete removal of the clamping device from the cam carrying element 27.

From the above description it will be seen that the shoulder 24 operates to withdraw the sleeve 25 during releasing movement, and that the head of the bolt 20 drives the sleeve into locking or clamping position. The present invention will allow the sleeve 25 to rotate freely upon the bolt 20, permitting adjustments with precision, and facilitating the removal of the clamping device from its locking position, yet preventing jamming and shearing of parts.

While the form of embodiment of the present invention as herein disclosed, constitutes a preferred form, it is to be understood that other forms might be adapted, all coming within the scope of the claims which follow.

What is claimed is as follows:

1. In an adjusting device, the combination comprising; a bolt having a circumferential groove between its ends; and a sleeve mounted on said bolt, said sleeve having an end extending into the groove of the bolt to prevent removal of said sleeve from said bolt, said sleeve being independently rotatable with respect to said bolt.

2. In an adjusting device, the combination comprising; a bolt having a conical circumferential groove between its ends; a sleeve telescopically engaging the bolt; and means extending into the groove of the bolt preventing removal of the sleeve from the bolt.

3. In an adjusting device, the combination comprising; a bolt having a head and a tapered circumferential groove, a sleeve disposed between the head and the groove; and means comprising a part of said sleeve pressed into the groove to prevent removal of the sleeve from the bolt, said sleeve being adapted for relative rotary movement with respect to said bolt.

4. In an adjusting device, the combination comprising; a bolt having a head and an annular groove, said groove disposed at a distance from the head; a sleeve disposed between the head and the groove; and means entering the groove to hold the sleeve between the head and the grove.

5. In a clamping device, the combination comprising a bolt having a head and a conical groove, said groove disposed at a distance from the head; and a sleeve loosely arranged between the head and the groove, said sleeve having one end extending into the groove preventing removal from said bolt, and said sleeve being independently rotatable on said bolt.

6. A clamping device, the combination comprising; a rod having a head and a groove located at a distance from the head; and a tapered sleeve loosely disposed between the head and the groove, said sleeve having an end extending in the groove to prevent the removal of the sleeve from the rod.

7. A clamping device, the combination comprising a bolt having a head and a conical groove located at a distance from the head; and a tapered sleeve loosely disposed between the head and the groove, said sleeve having an end extending in the groove to prevent removal of the sleeve from the bolt with the sleeve rotatable independently of said bolt.

8. The combination comprising, a bolt having a head and a shoulder, said should disposed at a distance from the head; and a sleeve disposed between the head and the shoulder, said sleeve having means adapted to engage the shoulder preventing removal thereof, said bolt and sleeve capable of relative rotary motion, yet restained from substantial relative axial movement.

9. The combination comprising, a bolt having a recess in its periphery; and a sleeve loosely mounted on the bolt, said sleeve having a portion entering the recess preventing removal thereof and allowing relative rotary motion and substantially restricting axial movement between the bolt and the sleeve.

In testimony whereof I hereto affix my signature.

CHARLES HALL DAVIS, Jr.